Figure 1:
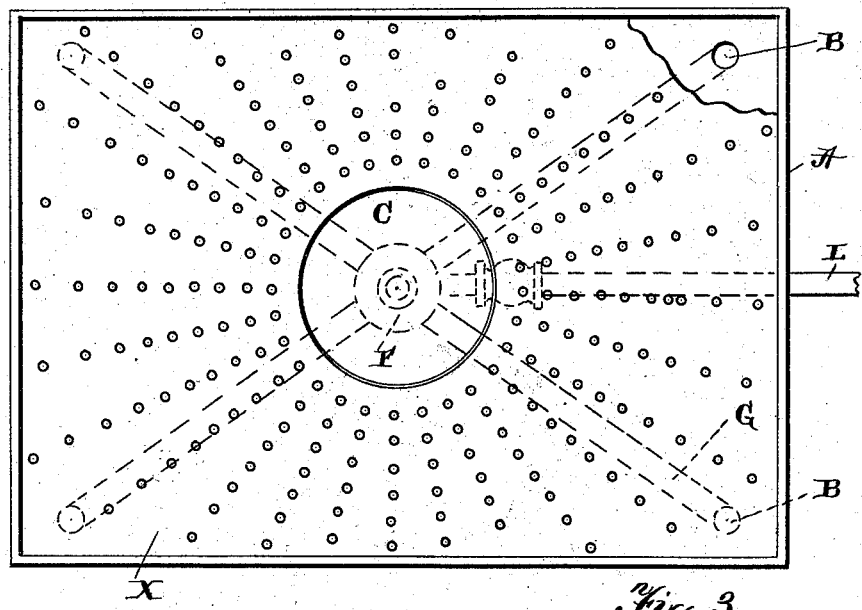

(No Model.)

G. FREIWALD.
BOTTLED BEER STEAMER.

No. 562,460. Patented June 23, 1896.

Witnesses
Geo. E. Frech
W. S. Boyd

Inventor
Gustav Freiwald.
By John G. Manahan,
Attorney

UNITED STATES PATENT OFFICE.

GUSTAV FREIWALD, OF STERLING, ILLINOIS, ASSIGNOR OF ONE-HALF TO LOUIS G. SPIES, OF SAME PLACE.

BOTTLED-BEER STEAMER.

SPECIFICATION forming part of Letters Patent No. 562,460, dated June 23, 1896.

Application filed August 26, 1895. Serial No. 560,530. (No model.)

*To all whom it may concern:*

Be it known that I, GUSTAV FREIWALD, a citizen of the United States, residing at Sterling, in the county of Whiteside and State of Illinois, have invented certain new and useful Improvements in Bottled-Beer Steamers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in bottled-beer steamers; and it consists in certain novel and efficient mechanism for accomplishing the steaming of the bottled beer in a uniform, convenient, and satisfactory manner.

As is well known to those familiar with the business of bottling beer, it is impracticable to eliminate all of the yeast principle from the beer when the latter is in readiness and condition otherwise for being bottled. The presence of the smallest particle of living yeast, if permitted to remain in the bottles, will soon begin a fermentation which will sour and destroy the beer.

The difficulty in the work of steaming beer after the latter has been bottled arises from the fact that it requires a certain temperature to effectually kill the yeast, so as to preclude any future fermentation therefrom, and that this degree of heat necessarily expands the air, gases, and vapor within the bottles with the resultant danger of bursting the latter, and if the temperature is permitted to rise much above that necessary, as aforesaid, the bursting of the bottle is almost certain to ensue. The method heretofore employed for this purpose has been to fill and effectually cork the bottles by appliances which will not permit the cork to escape, then to place the bottles thus filled and corked in a vessel containing sufficient water to submerge the bottle and then heat the water to the desired temperature by means of steam injected therein. In order to have the necessary progress in this work, a large number of these filled bottles must be treated at the same time. The receptacle therefor being necessarily somewhat capacious, the difficulty has been to heat all of the water at a uniform temperature sufficient to kill the yeast as aforesaid. This difficulty is increased by the fact that the bottles are seated in the receptacle very closely together and the movement of the water thereby greatly impeded.

My purpose is to overcome these difficulties and to impart to the whole body of water an equal temperature to any desired degree by drawing the water downwardly through the bottom of the vessel or receptacle at different localities in the base of the latter and to discharge the water thus drawn upward through the bottom of said receptacle with a swirl and in connection with steam and at as many points as the size of the receptacle may render desirable.

I have reduced my invention to actual practice and in the use thereof have proven by experience that it will accomplish the result desired.

I attain the above objects by the mechanism illustrated in the accompanying drawings, in which—

Figure 2:
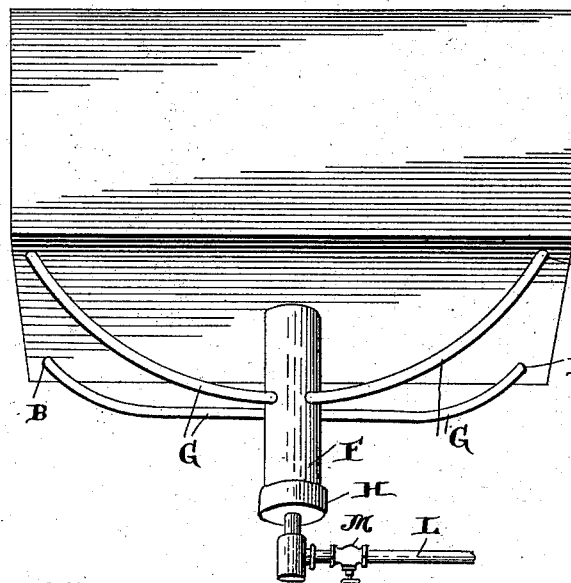
Figure 3:
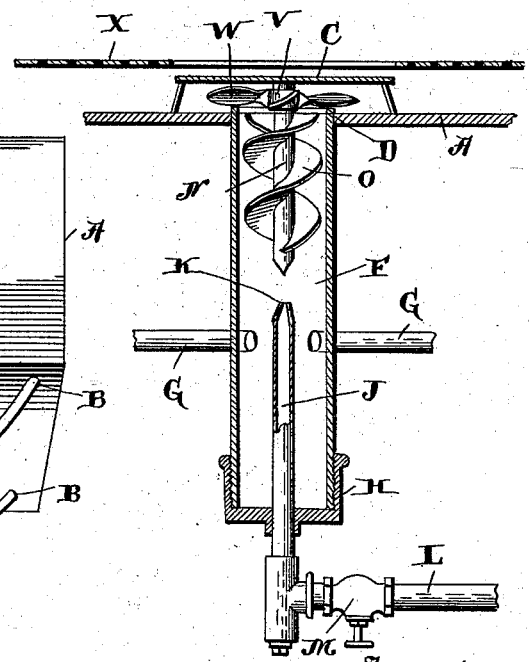

Figure 1 is a plan of a steaming-receptacle provided with my invention. Fig. 2 is a view in perspective of the bottom of said receptacle exhibiting the application to the latter of my invention. Fig. 3 is a detail, partly in section, of the mechanism for commingling the steam and water, including the inlet and discharge openings.

Similar letters refer to similar parts throughout the several views.

A is a receptacle in which the beer-bottles, after being effectually filled and corked, are placed in an erect position. This receptacle may be of any desired shape or size. In the base of the receptacle A are formed openings B, located preferably near the corners or margins of the receptacle and in such number as may be desired.

C is a circular plate suitably supported from the bottom of the receptacle A about an inch above the upper end of the combined steam and water inlet opening D.

F is a vertical tube suitably attached to the base of the receptacle A and projected through the opening D in the bottom of the latter, directly under the plate C.

G G are water-pipes communicating at their outer ends with the openings B in the base of A and at their inner ends with the interior of the vertical tube F.

H is an inverted cap, screw-seated in the lower end of the tube F. A hollow steam-stem J is rigidly seated centrally in the base of the cap H and extended upwardly through the latter and projected within the tube F to a point about an inch above the junction with the latter of the water-pipes G. The upper end of the stem J is of a conical form and provided with a central opening K. The stem J extends a suitable distance below the cap H and is seated at its lower extremity in the steam-pipe L, the latter being provided with the usual adjusting and stop cock M.

On the lower surface of the plate C there is rigidly seated and projected downwardly into the upper end of the tube F the steam and water diverter N, provided peripherally with double spiral flanges O.

A rotating collar V, provided with distributing-wings W, is loosely seated on the diverter N directly under the plate C and serves to thoroughly distribute the water and steam received through the tube F, and from the diverter N.

A perforated bottom X, provided with short legs 1, is seated on the inner surface of the bottom of the receptacle A and about an inch and one-half above said bottom. This perforated bottom is preferably placed in sections for convenience of removal and replacement in cleaning up. The bottles rest on the bottom X, leaving the space below it and the bottom of the said receptacle for the free and unobstructed passage of the water to the openings B and from the opening D. As the water can pass freely through the perforated bottom X both up and down, between the bottles, portions of water of different degree are readily and thoroughly intermixed.

The operation of my invention is as follows: The receptacle A being suitably filled with the bottles of beer submerged in water, steam is admitted through the inlet-pipe L to the lower portion of the steam-stem J and driven up through said stem through the tube F, spirals O, and thrown outwardly in opposite directions into the receptacle A in the bottom of the water therein. This action creates a suction in the tube F and causes the water to flow downwardly through the openings B (the mouth of the latter being covered with perforated plates P to prevent the inflow of anything which might clog the pipes) through the pipes G into the pipe F, and from thence the water is carried by the action of the steam and heated meanwhile and discharged therewith into the main body of water in the receptacle A radially from under the plate C. The water by this means is caused to circulate not only through the pipes G and tube F, but also through the various parts of the interior of the receptacle A. The steam has two actions in heating the water: first, by its contact therewith in the tube F, and, second, by its direct discharge therewith into the main body of water. Another advantage is that the water is given a momentum while passing up the tube F by its aforesaid connection with the steam and is thereby thrown out into the receptacle A with greater force than the steam would exert alone or the water would have if it was simply a matter of circulation.

An additional advantage is the discharge of the combined steam and steam-heated water into the lower portion of the body of the water in the receptacle A, as the natural tendency is for the heated water to remain at the top.

My invention draws the cooler water from the bottom through the openings B and discharges the heated water and steam into the receptacle A close to the bottom of the latter, from whence it gradually rises toward the top, and thus the entire body of water is uniformly heated.

What I claim as my invention, and desire to secure by Letters Patent of the United States, is—

1. In a bottled-beer steamer, the combination, with a receptacle, the bottom of which is provided with inlet and outlet openings, a tube communicating with the inlet-opening, a steam-stem projecting into the interior of the tube, pipes communicating with the outlets of the bottom of the receptacle and with the tube below the end of the steam-stem, a diverter above the end of the tube, and a rotatable deflector at the upper end of said diverter, substantially as set forth.

2. In a bottled-beer steamer, the combination, with a receptacle, of a tube in the bottom thereof, a steam-stem projecting into the tube, a plate above the end of the tube, a diverter rigidly secured to the plate and projecting into the tube, the periphery of which is provided with a spiral, a collar loosely mounted upon the tube between the spiral and the plate, and wings secured to the collar and movable between the plate and the bottom of the receptacle, substantially as set forth.

3. The combination of the receptacle A provided with openings B in its base, a tube F seated in the base of receptacle A, pipes G connecting the openings B with the interior of tube F below said receptacle, a plate C seated over the outlet of tube F, a diverter N provided with peripheral flanges O seated centrally in the upper end of the tube F, steam-stem J provided with opening K in its upper end and projected within the lower portion of the tube F, the rotating collar V, provided with wings W, and a feed-steam pipe L communicating with the lower portion of the stem J substantially as shown and for the purpose described.

4. In a bottled-beer steamer, a receptacle having a plate suitably supported above the bottom thereof, a tube attached to the base of the receptacle and communicating by pipes with the same, a steam-stem projecting into said tube a stationary diverter having a spiral periphery in the upper end of said tube, and a rotatable deflector at the upper end of said diverter and below said plate, said parts being combined, substantially as described.

5. In a bottled-beer steamer, a receptacle having a plate suitably supported above the bottom thereof, a tube connected with the base of the receptacle, pipes communicating with said receptacle and said tube, a steam-stem projecting into said tube, a stationary diverter in said tube, and a rotatable deflector above said diverter, said parts being combined, substantially as described.

In testimony whereof I affix my signature in presence of two witnesses.

GUSTAV FREIWALD.

Witnesses:
JOHN G. MANAHAN,
LOUIS G. SPIES.